US012639738B1

(12) United States Patent
Sadanand et al.

(10) Patent No.: US 12,639,738 B1
(45) Date of Patent: May 26, 2026

(54) PRODUCT IDENTIFICATION FOR SELF-CHECKOUT IN CUSTOMIZED RETAIL ENVIRONMENTS

(71) Applicant: Amazon Technologies, Inc., Seattle, WA (US)

(72) Inventors: Sreemanananth Sadanand, Shrewsbury, MA (US); Meng Sun, Palo Alto, CA (US); Dominic Roberts, Seattle, WA (US); Shun Miao, Vienna, VA (US); Xiang Ma, Lexington, MA (US); Gregory Donald Hager, Springfield, VA (US); Yi-Han Chen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 43 days.

(21) Appl. No.: 18/542,535

(22) Filed: Dec. 15, 2023

Related U.S. Application Data

(60) Provisional application No. 63/538,193, filed on Sep. 13, 2023.

(51) Int. Cl.
*G06Q 30/0601* (2023.01)
*G06Q 20/18* (2012.01)
(Continued)

(52) U.S. Cl.
CPC ......... *G06Q 30/0629* (2013.01); *G06Q 20/18* (2013.01); *G06Q 20/208* (2013.01);
(Continued)

(58) Field of Classification Search
CPC .............. G06Q 30/0629; G06Q 20/18; G06Q 20/208; G06Q 30/0633; G06V 10/761;
(Continued)

(56) References Cited

U.S. PATENT DOCUMENTS 6,471,125 B1 * 10/2002 Addy ..................... G07G 3/003
235/462.14
8,320,633 B2 * 11/2012 Ross .................... G06V 10/143
382/110
(Continued)

*Primary Examiner* — Michael Jared Walker
(74) *Attorney, Agent, or Firm* — Athorus, PLLC

(57) ABSTRACT

This disclosure describes systems and techniques for recognizing, or identifying, produce items being purchased at a self-checkout device. The self-checkout device may use a produce-recognition system that uses image-based recognition techniques so that items, such as produce, may be identified without the need for users to enter in keywords or price look-up (PLU) codes. The produce-recognition system may compare feature representations between the produce to be purchased, produce categories, and produce subcategories. Based on similarities with produce categories and produce subcategories, the identity of the produce item may be predicted. Ranked produce categories and subcategories may presented to the user. The presentation of produce categories and subcategories may depend on confidence levels associated with the predicted produce categories. The produce item may then be identified and added to a virtual cart.

20 Claims, 8 Drawing Sheets

(51) Int. Cl.

| | |
|---|---|
| *G06Q 20/20* | (2012.01) |
| *G06V 10/74* | (2022.01) |
| *G06V 10/764* | (2022.01) |
| *G06V 10/94* | (2022.01) |
| *G06V 20/52* | (2022.01) |
| *G06V 20/68* | (2022.01) |

(52) U.S. Cl.
CPC ....... *G06Q 30/0633* (2013.01); *G06V 10/761* (2022.01); *G06V 10/764* (2022.01); *G06V 10/945* (2022.01); *G06V 20/52* (2022.01); *G06V 20/68* (2022.01)

(58) Field of Classification Search
CPC .... G06V 10/764; G06V 10/945; G06V 20/52; G06V 20/68
See application file for complete search history.

(56) References Cited

U.S. PATENT DOCUMENTS

| | | | | |
|---|---|---|---|---|
| 10,282,431 | B1* | 5/2019 | Bhotika | G06F 16/5838 |
| 11,176,529 | B2* | 11/2021 | Crooks | G01G 19/4144 |
| 11,423,636 | B2* | 8/2022 | Najibikohnehshahri | |
| | | | | G06N 3/084 |
| 11,893,065 | B2* | 2/2024 | Fleming | G06N 20/00 |
| 11,893,505 | B1* | 2/2024 | Fleming | G06F 16/93 |
| 2020/0372228 | A1* | 11/2020 | Rodriguez | G06Q 30/00 |
| 2022/0277313 | A1* | 9/2022 | Migdal | G06Q 20/20 |
| 2022/0277368 | A1* | 9/2022 | Tagra | G06F 3/0486 |
| 2023/0078450 | A1* | 3/2023 | Ruan | G06Q 30/0202 |
| | | | | 705/7.31 |
| 2023/0342365 | A1* | 10/2023 | Agarwal | G06F 16/2457 |
| 2024/0242260 | A1* | 7/2024 | Shanker | G06Q 30/0631 |
| 2025/0005897 | A1* | 1/2025 | Capuano | G06Q 20/208 |

* cited by examiner

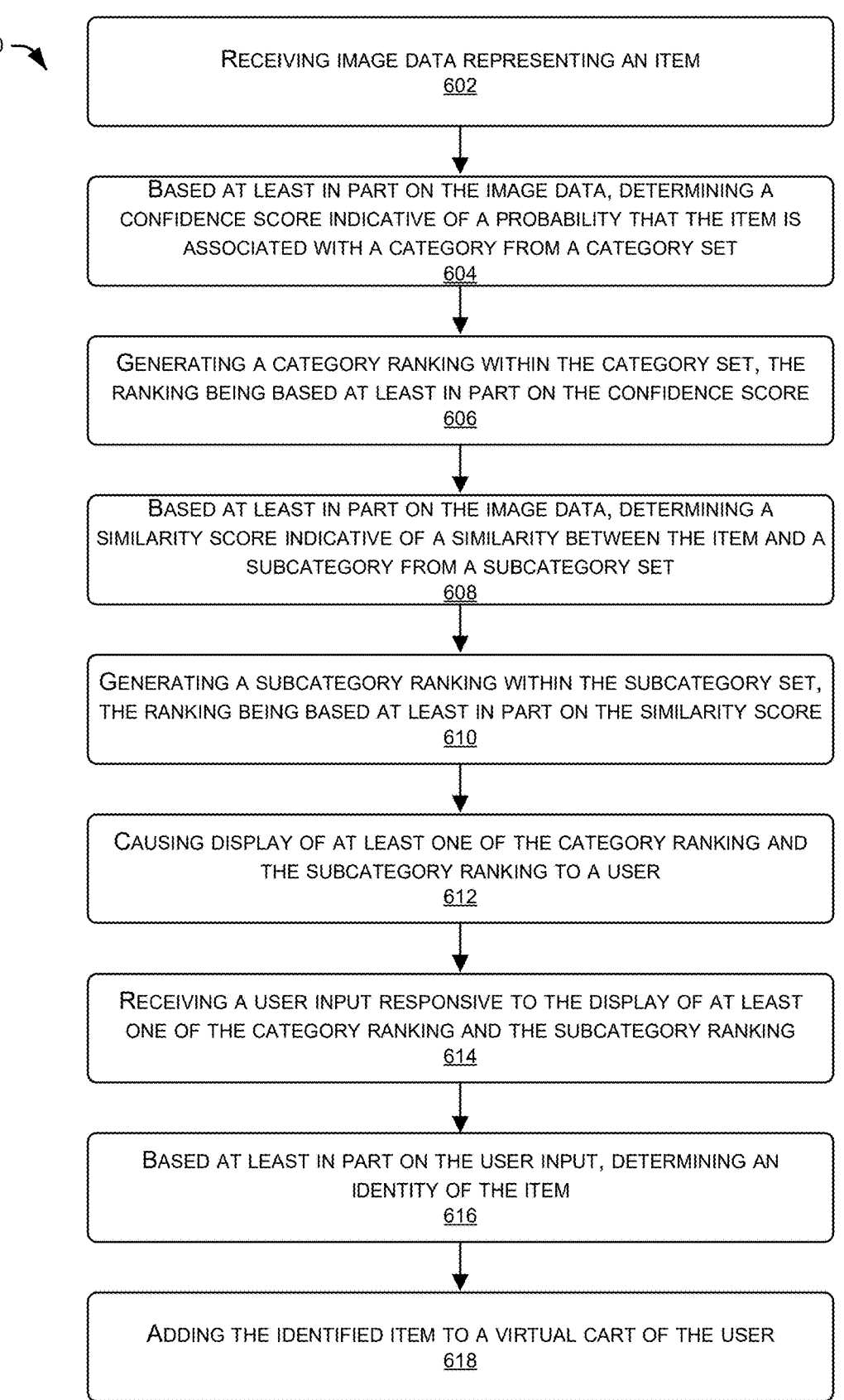

600

RECEIVING IMAGE DATA REPRESENTING AN ITEM
602

BASED AT LEAST IN PART ON THE IMAGE DATA, DETERMINING A CONFIDENCE SCORE INDICATIVE OF A PROBABILITY THAT THE ITEM IS ASSOCIATED WITH A CATEGORY FROM A CATEGORY SET
604

GENERATING A CATEGORY RANKING WITHIN THE CATEGORY SET, THE RANKING BEING BASED AT LEAST IN PART ON THE CONFIDENCE SCORE
606

BASED AT LEAST IN PART ON THE IMAGE DATA, DETERMINING A SIMILARITY SCORE INDICATIVE OF A SIMILARITY BETWEEN THE ITEM AND A SUBCATEGORY FROM A SUBCATEGORY SET
608

GENERATING A SUBCATEGORY RANKING WITHIN THE SUBCATEGORY SET, THE RANKING BEING BASED AT LEAST IN PART ON THE SIMILARITY SCORE
610

CAUSING DISPLAY OF AT LEAST ONE OF THE CATEGORY RANKING AND THE SUBCATEGORY RANKING TO A USER
612

RECEIVING A USER INPUT RESPONSIVE TO THE DISPLAY OF AT LEAST ONE OF THE CATEGORY RANKING AND THE SUBCATEGORY RANKING
614

BASED AT LEAST IN PART ON THE USER INPUT, DETERMINING AN IDENTITY OF THE ITEM
616

ADDING THE IDENTIFIED ITEM TO A VIRTUAL CART OF THE USER
618

FIG. 6

PRODUCT IDENTIFICATION FOR SELF-CHECKOUT IN CUSTOMIZED RETAIL ENVIRONMENTS

CROSS-REFERENCE TO RELATED APPLICATIONS

This application claims priority to U.S. Provisional Application No. 63/538,193 filed Sep. 13, 2023, entitled "Product Identification for Self-Checkout in Customized Retail Environments," the entirety of which is herein incorporated by reference.

BACKGROUND

As retail stores continue to improve the point-of-sale experience for customers, many different methods have been introduced to create a more efficient item checkout. Many stores offer self-checkout stations to enable customers to purchase goods quickly and without the need for staff assistance. These self-checkout stations rely on the customer to manually scan or enter the item into the system, such as using a keyword lookup or price-look-up codes (PLUs). This process may become onerous for customers as an item may have many different variants, or the customer may not be familiar with the name of an item. Further, similar-looking items can lead to the customer entering in an incorrect item. These difficulties are especially common for items such as produce.

BRIEF DESCRIPTION OF THE DRAWINGS

The detailed description is set forth with reference to the accompanying figures. In the figures, the left-most digit(s) of a reference number identifies the figure in which the reference number first appears. The same reference numbers in different figures indicate similar or identical items. The systems depicted in the accompanying figures are not to scale and components within the figures may be depicted not to scale with each other.

FIG. 6 illustrates a flow diagram of an example process for automatically recognizing produce items being purchased at a self-checkout device, according to at least some examples.

DETAILED DESCRIPTION

Figure 1:
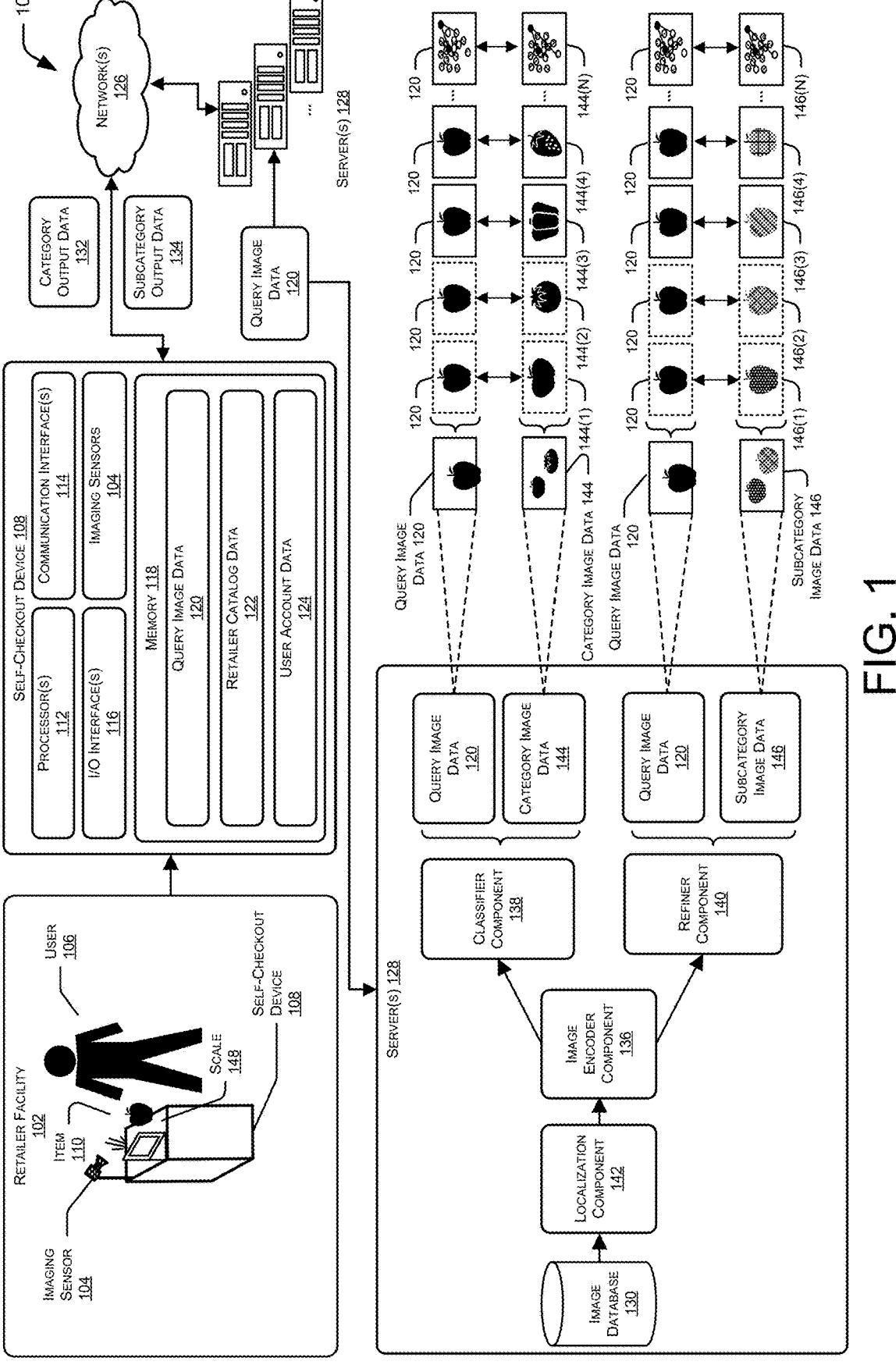
FIG. 1 illustrates a schematic diagram of an illustrative environment for the automatic recognition of produce items being purchased at a self-checkout device, according to at least some examples.

This disclosure describes systems and techniques for recognizing, or identifying, produce items being purchased at a self-checkout device. The self-checkout device may use a produce-recognition system that uses image-based recognition techniques so that items, such as produce, may be identified without the need for users to enter in keywords or price look-up (PLU) codes. The produce-recognition system may compare feature representations between the produce to be purchased, produce categories, and produce subcategories. Based on similarities with produce categories and produce subcategories, the identity of the produce item may be predicted. Ranked produce categories and subcategories may presented to the user. The presentation of produce categories and subcategories may depend on confidence levels associated with the predicted produce categories. The produce item may then be identified.

Traditionally, users have used staffed checkout counters in order to purchase items from a retailer facility. However, this type of point-of-sale is heavily dependent on staff availability on a one-to-one basis. In order to help address this issue, self-checkout stations have been heavily proliferated by retailers, which enable users to purchase items without the need for staff intervention. For instance, users may complete a transaction by scanning the item's barcode, looking up by the item by keywords, and/or entering in price-look-up codes (PLUs). While self-checkout stations reduce the need for staff assistance and may increase customer satisfaction by providing a quicker checkout experience, various issues arise when trying to correctly identify the item the user wishes to purchase. For example, self-checkout stations rely on the user for not only entering in an item correctly (e.g., with a keyboard lookup, PLU code, etc.), but also for having knowledge of the item they are purchasing. Various detection and classification processes may be used to recognize an item from among multiple items to add to a user's transaction (hereinafter "virtual cart"). The techniques described herein may be particularly helpful for ambiguous items such as produce.

When customers wish to purchase produce at a self-checkout station, they may place the produce on a weight scale and identify the produce by manually entering in a keyword and/or browsing through a voluminous catalog of different produce. However, certain types of produce may be visually similar to one-another (e.g., flat-leaf parsley and cilantro), or there may be a multitude of varieties for a given produce (e.g., different types of apples). In situations where a customer is purchasing this type of ambiguous produce, the customer may spend extra time attempting to identify the produce. Further, the customer may incorrectly identify the produce altogether and be charged incorrectly, as well as create inventory inaccuracies for the retailer. Thus, automatic recognition of items and additional types of auxiliary data may be helpful to identify a self-checkout item in order to reduce friction in the self-checkout experience.

Described herein are, at least in part, techniques including the processing of image data that represents an item for purchase using a bifurcated classification process to predict an appropriate item category and/or subcategory as well as using retail-specific auxiliary data. The techniques described herein may be applicable in various scenarios, including scenarios when a self-checkout user would like to purchase produce.

To use the produce-recognition system, a user may interact with a self-checkout device positioned in a retailer facility. For example, the user may start by placing the produce item (hereinafter "queried produce item") on a weight sensor (e.g., a scale) at the self-checkout device. Upon placing the produce item on the weight scale and/or sensor, the self-checkout device may detect the produce item positioned in the self-checkout environment, and collect image data of the queried produce item. For example, the self-checkout device may include one or more imaging sensors (e.g., a camera) that captures image data for produce items placed in view of the camera.

Once the self-checkout device has obtained the image data of the queried produce item, the self-checkout device may use this data to determine the identity of the queried produce item. In some examples, the produce-recognition system may be implemented according to a split architecture where the self-checkout device performs image capturing and display, while more processes may be performed using a backend, server-based implementation. For example, the produce-recognition system may include one or more network-based computing devices position at a remote, cloud-based location.

In such examples, the self-checkout device may send the image data of the queried produce item to the cloud-based devices. The cloud-based devices of the produce-recognition system may perform various processing techniques on the image data of the queried produce item such that the produce-recognition system is able to predict the identity of the queried produce item.

After receiving the image data of the queried produce item, the produce-recognition system may localize (e.g., identify and/or locate) the queried produce item in the image data, as well as identify a container that the queried produce item may be in (i.e., a produce bag). In this way, only the part of the image data depicting the queried produce item will be embedded and processed with greater accuracy by the produce-recognition system, as opposed to including any background objects of the self-checkout environment. Further, if the queried produce item is identified as being either bagged or unbagged, it will be compared to other bagged or unbagged image embeddings in produce categories or subcategories, as discussed in more detail below.

In some instances, the produce-recognition system may store image data representing produce categories (e.g., apples, bell peppers, tomatoes, etc.) and/or image data representing produce subcategories within a category of produce (e.g., Gala apple, Golden Delicious apple, etc.). Further, the stored image data representing produce categories and/or produce subcategories may include produce that is bagged and/or unbagged. In such examples, the image data both generated by the camera and stored by the produce-recognition system may be processed using an image encoder to convert the image data to embeddings representing features of the produce.

In such examples, the produce-recognition system may compare the image embeddings of the queried produce image to the image embeddings of produce categories. For example, the produce-recognition system may use processing techniques such as feature vectors to determine the similarity between the queried produce embeddings and the produce category embeddings. The feature vectors may represent image data as numeric arrays. In some examples, the produce-recognition system may include one or more trained models (e.g., machine-learning models) that have been trained to receive image data of the queried produce item as input, and output feature vectors representing the features of the queried produce item. In another example, the produce-recognition system may include one or more trained models that have been trained to receive image data of the queried produce item as input, and output ranked predictions of the identity of the queried produce item.

Upon comparing the feature vectors of the queried produce item to the feature vectors of each produce category, the produce-recognition may determine similarity metrics for the feature vectors of the produce categories. For example, the feature vectors may be compared using matrix-based math to determine a difference and/or distance between feature vectors, and determine the similarity metric. In some examples, the similarity metrics may be represented as a probability of accurately recognizing the queried produce item (i.e., a "confidence score"). Using these confidence scores, the produce-recognition system may create a hierarchy, or ranking, of the produce categories. For example, the confidence score may represent a probability of accurately recognizing the queried produce item. In some examples, the confidence score may increase as the correspondence between the produce category and queried produce item increases and/or the similarity metric increases.

In some instances, some or all of the produce categories may include produce subcategories. In this example, the produce-recognition system may compare the image embeddings of the queried produce image to the image embeddings of the produce subcategories using the same processing technique of the feature vectors. After comparing the feature vectors of the queried produce item to the feature vectors of the of each produce subcategory, the produce-recognition may determine similarity metrics for the feature vectors of the produce subcategories (i.e., a "similarity score"). The similarity score may be based on a vector's distance, where in some examples the similarity score may increase as the correspondence between the produce subcategory and queried produce item increases and/or the similarity metric increases. Using these similarity scores, the produce-recognition system may create a hierarchy, or ranking, of the produce subcategories. For example, the produce subcategory with the highest similarity score will be ranked the highest, and thus be the most similar to the queried produce item.

Continuing from the example above, the retailer facility from which the user is using the self-checkout device may have specific inventory or nomenclature for different produce items. For example, there may be a produce subcategory that is determined to be visually similar to the queried produce item by the produce-recognition system, but is not a produce subcategory that is actually sold at the retailer facility. Further, produce names may be region-specific. In light of this, the techniques described herein include the use of retailer-specific information in identifying queried produce items. For example, the produce-recognition system may compare the ranked produce categories and the ranked produce subcategories to a retailer-specific catalog of produce items, such as a merchant catalog. Thus, even if a category or subcategory of produce is ranked, it may not be presented to the user as a produce identity prediction because it is not in the retailer catalog. In another example, the user may have a user account associated with the retailer, and the self-checkout device may provide user account data to the produce-recognition system with permission and/or upon explicit request by the user. For example, user account data may include the user's purchase history. The produce-recognition system may compare the ranked produce categories and the ranked produce subcategories to the user's purchase history before being presented to the user.

In some instances, the produce-recognition system may present the ranked produce categories and/or ranked produce categories to the user of the self-checkout device. For example, the rankings may be presented to the user as user interface components on a user interface (e.g., a touch screen at the self-checkout device). While the produce-recognition system may rank the produce categories based on their relative confidence score, some rankings may have a greater spread of confidence score than others. For example, a ranking may include pineapple with a high confidence score (e.g., 95% confidence) follow by *papaya* with a low confidence score (e.g., 5% confidence). In another example, a ranking may include oranges, lemons, and limes with less disparate confidence scores (e.g., 50% confidence, 35% confidence, and 5% confidence, respectively). However, the self-checkout device may be configured to display the ranked produce categories and/or ranked produce subcategories only when a produce confidence score is at or above a threshold value.

In light of this, the techniques described herein include the produce-recognition system identifying different confidence workflows at the self-checkout device, and presenting the ranked predictions of produce categories and/or subcategories to the user based on the confidence workflows. For example, a high confidence workflow may include produce categories that are at or above a threshold value, such as 85% confidence. With the high confidence workflow, the produce-recognition system may cause both the ranked produce category predictions and ranked produce subcategory predictions to be presented to the user at the self-checkout device. The user may then select a produce subcategory, and the produce-recognition system may use this user input to identify the queried produce item and add the identified produce item to the user's virtual cart.

In another example, a medium confidence workflow may include produce categories that are at or above a threshold value, such as 50%. With the medium confidence workflow, the produce-recognition system may cause only the ranked produce category predictions to be presented to the user at the self-checkout device. The user may then select a produce category and based on this user input the produce-recognition system may cause the ranked produce subcategory predictions that are within the selected produce category to be displayed. The user may then select a produce subcategory, and the produce-recognition system may use this user input to identify the queried produce item and add the identified produce item to the user's virtual cart.

In another example, a low confidence workflow may include produce categories that are below a threshold value, such as 50%. With the low confidence workflow, the produce-recognition system may cause a course-level of category sets (e.g., fruits, vegetables, meat, dairy, etc.) to be presented to the user at the self-checkout device. The user may then manually go through the course-level category sets and select the produce category and subcategory until the produce-recognition system identifies the produce item and adds the identified produce item to the user's virtual cart.

In some instances, the produce-recognition system may include a machine-learning model that may be trained or configured to rank produce category predictions and produce subcategory predictions with different sets of rules, or "biases." For example, after produce categories and subcategories are presented to the user at the self-checkout device, the user makes a selection, and the queried produce item is identified. The machine-learning model may intake the historical data of queried produce identifications, where the historical data may indicate the confidence scores at which the predicted produce categories are correctly identified. In another example, the produce-recognition system may use user verification techniques to iteratively audit the query produce identification against the captured image data of the query produce. Using the historical data and/or verification data, the machine-learning model may output calibrated thresholds for high, medium, and low confidence workflows.

For example, historical data may indicate that when predicted produce categories have a confidence score of 80% to 100%, the prediction is typically correct. Based on this input, the threshold for the high confidence workflow may be calibrated from 85% to 80%.

Although the techniques described herein are primarily with reference to predicting produce categories and produce subcategories for the purpose of identifying a produce item for purchase, the techniques are equally applicable to any industry in which item recognition is helpful. For instance, the produce-recognition system (or alternatively, item-recognition system) may be implemented for use with other types of items that may be variable or ambiguous, such as meat. Further, while certain types of machine-learning models and algorithms are discussed herein, the techniques may be employed using other types of technologies and are generally scalable to different computer-based implementations.

The following description describes use of techniques with a self-checkout device in a retailer facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for purchasing items. In other implementations, the techniques described herein may be implemented in other facilities or situations.

Certain implementations and examples of the description will now be described more fully below with reference to the accompanying figures, in which various aspects are shown. However, the various aspects may be implemented in many different forms and should not be construed as limited to the implementations set forth herein. The description encompasses variations of the examples, as described herein. Like numbers refer to like elements throughout.

FIG. 1 is an example environment 100 of a retailer facility 102 that includes a self-checkout device 108. As FIG. 1 depicts, the user 106 may be engaged in checking out a produce item, such as produce item 110, where the user 106 places the produce item 110 on the self-checkout device 108, such as on scale 148. As illustrated, the self-checkout device 108 may include one or more sensors, such as imaging sensor 104. In this example, the imaging sensor 104 may be configured to detect the produce item 110 positioned in the environment of the self-checkout device 108. For example, the imaging sensor 104 may be a camera configured to detect the produce item 110 when the produce item 110 is placed in view of the camera. Further, the imaging sensor 104 may be configured to collect query image data 120 of the produce item 110. The self-checkout device 108 may comprise components for performing at least a characteristic of the techniques of predicting the identity of an item for purchase, as may the servers. Components of the server(s) 128 are described in further detail below with reference to subsequent figures. For example, the self-checkout device 108 may comprise one or more processors 112 configured to power components of the self-checkout device 108 and may further include memory 118 which stores components that are at least partially executable by the processors 112.

The self-checkout device may receive user input requesting to purchase an item, such as an input made via I/O interface(s) 116 (e.g., tough screen, mouse, keyboard, etc.) of a user interface component presented on display at the self-checkout device. After receiving the request to purchase the produce item 110, the imaging sensor 104 at the self-checkout device 108 may obtain query image data 120 of the produce item 110. Once the imaging sensor 104 has obtained the query image data 120, the self-checkout device 108 may send (e.g., upload, stream, etc.) the query image data 120 to the server(s) 128 over one or more network(s) 126 using one or more communication interface(s) 114.

The network(s) 126 may include private networks such as institutional or personal intranet, public networks such as the Internet, or a combination thereof. The network(s) 126 may be implemented using wired infrastructure or wireless infrastructure (e.g., cellular, microwave, satellite, etc.), or other connection technologies. The communication interface(s) 114 may include devices configured to couple to personal area networks (PANs), wired and wireless local area networks (LANs), wired and wireless wide area networks (WANs), and so forth.

One or more components of the server(s) 128 may store the query image data 120 in an image database 130. As described in more detail below, the image database 130 may also store image data of produce categories and subcategories. That is, the query image data 120 is stored such that it may be compared to the image data of the other produce categories and subcategories. Localization component 142 may preprocess the query image data 120 by extracting features representing produce item 110 and removing background objects that may be present in the query image data 120. Upon receiving the query image data 120, one or more components of the server(s) 128 may generate image embeddings using the query image data 120. The image embeddings may be in vector form and represent the features of produce items, such as produce item 110. The image encoder component 136 may also generate category image data 144 and subcategory image data 146 from the image data of produce categories and subcategories, respectively.

The image database 130 may store image data of produce categories and/or image data of produce subcategories. Produce categories may include apples, bell peppers, tomatoes, strawberries, and the like. Produce subcategories within a category, for example apples, may include Gala apples, Fuji apples, Honeycrisp apple, etc. The image encoder component 136 may generate category image data 144 and subcategory image data 146, which may include image embeddings representative of the produce categories and/or produce subcategories. The image embeddings may be in vector form and represent the features of the produce items in a category and/or subcategory. In one example, the classifier component 138 may determine the prediction of the identity of the produce item 110 using a neural network configured to predict produce categories and/or subcategories using the query image data 120. In another example, the classifier component 138 may process the query image data 120 to determine a prediction of the identity of the produce item 110 using a similarity-based retrieval. For instance, the classifier component 138 may compare the query image data 120 with the category image data 144. For example, query image data 120 may represent the features of an apple. The query image data 120 are compared to other produce category image data 144, such as the image embeddings for an apple 144(1), tomato 144(2), bell pepper 144(3), strawberries 144(4), or produce category 144(N) (where "N" is any integer greater than 1). As described in more detail below with respect to FIG. 3, the image embeddings may be in vector form, such as with 144(N), and the classifier component 138 may compute measures of similarities for each category image data 144 that the query image data 120 is compared to.

Upon identifying similar category image embeddings, the classifier component 138 may generate category output data

132 indicating the result of the comparison of the query image data 120 and category image data 144. For example, the category output data 132 may indicate that the embeddings of query image data 120 are similar to the embeddings of category image data 144(1), but is not similar to embeddings of category image data 144(2). In another example, the classifier component 138 may generate category output data 132 indicating the result of the neural network. The category output data 132 may also indicate a probability, or "confidence score," of the category image data 144 accurately identifying the produce item 110 represented by the query image data 120. In some examples, the classifier component 138 may rank the categories based their respective confidence scores, which may be used by the self-checkout device 108 in presenting the predictions of the produce item 110 to the user 106. In some instances, the refiner component 140 may process the query image data 120 to determine a prediction of the identity of the produce item 110. For instance, the refiner component 140 may compare the query image data 120 with the subcategory image data 146. For example, the query image data 120 may represent the features of an apple. The query image data 120 are compared to other produce subcategory data 146 such as the image data for a Gala apple 146(1), Fuji apple 146(2), or apple subcategories 146(3)-146(N) (where "N" is any integer greater than 1). As described in more detail below with respect to FIG. 3, the image embeddings may be in vector form, such as with 146(N), and the refiner component 140 may compute measures of similarities for each subcategory image data 146 that the query image data 120 is compared to.

Upon identifying similar subcategory image embeddings, the refiner component 140 may generate subcategory output data 134 indicating the result of the comparison of the query image data 120 and subcategory image data 146. For example, the subcategory output data 134 may indicate that the embeddings of query image data 120 are similar to the embeddings of subcategory image data 146(1), but is not similar to the embeddings of subcategory image data 146(2). In another example, the refiner component 140 may generate subcategory output data 134 indicating the result of the neural network. The subcategory output data 134 may also indicate a "similarity score" for the subcategory image data 146. The similarity score may be a vector's distance, where in some examples the similarity score may increase as the correspondence between the produce subcategory and queries produce item increases and/or the similarity metric increases. In some examples, the refiner component 140 may rank the subcategories based on their respective similarity scores, which may be used by the self-checkout device 108 in presenting predictions of the produce item 110 to the user 106.

In one example, the category output data 132 and/or subcategory output data 134 may be sent by the server(s) 128 to the self-checkout device 108 via network(s) 126. In this way, the self-checkout device 108 may use the category output data 132 and/or subcategory output data 134 to display the rankings of produce categories and/or subcategories as predictions of the identity of the produce item 110. The self-checkout device 108 may present such identity predictions via I/O interface(s) 116, described in more detail below with respect to FIGS. 4A-4C.

Further, the self-checkout device 108 may use the retailer catalog data 122 and/or user account data 124 to further process the category output data 132 and/or subcategory output data 134. For example, retailer catalog data 122 may indicate the inventory present at the retailer facility 102, including specific names, or labels, of inventory. The self-checkout device 108 may compare the category output data 132 and/or subcategory output data 134 to the retailer catalog data 122, and remove any identity predictions not present in the retailer inventory. Further, user account data 124 may indicate purchase history, buying patterns, etc. of the user 106 with permission and/or upon explicit request by the user. The self-checkout device 108 may compare the category output data 132 and/or subcategory output data 134 to the retailer catalog data 122, and adjust the ranked predictions based on the user account data 124.

In another example, the user 106 may have a user account associated with the retailer facility 102, and the self-checkout device 108 may obtain user account data with permission and/or upon explicit request by the user 106. For example, user account data may include the user's purchase history. The self-checkout device may compare the ranked produce categories and the ranked produce subcategories to the user's purchase history before being presented to the user 106.

In some instances, the self-checkout device 108 may present the ranked produce categories and/or ranked produce categories to the user 106 of the self-checkout device 108. For example, the rankings may be presented to the user as user interface components on a user interface (e.g., a touch screen at the self-checkout device).

Figure 2:
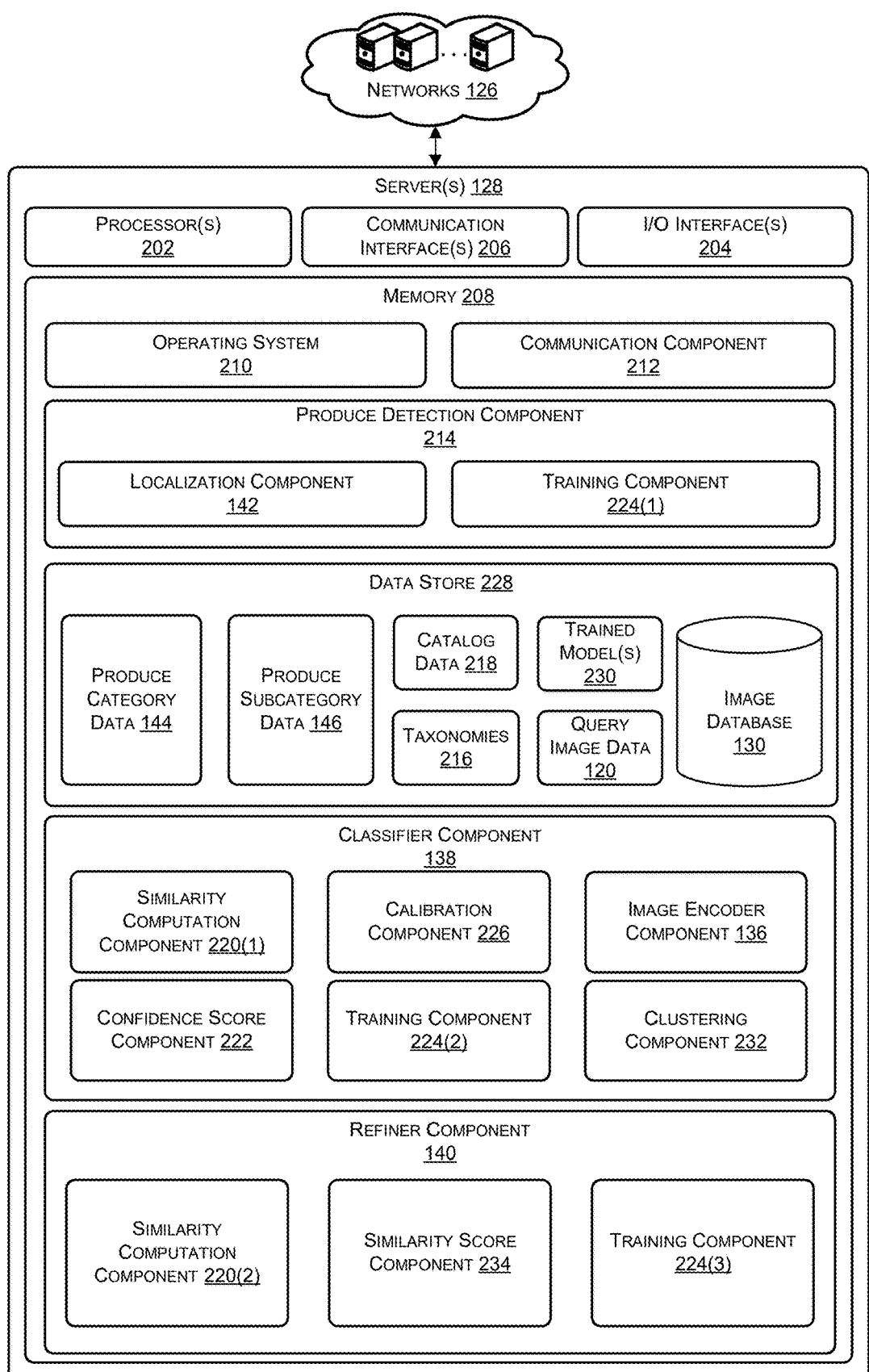
FIG. 2 illustrates example components of the system of FIG. 1 that performs image processing for an image of a produce item to predict its identity using both categories and subcategories of produce, according to at least some examples.

FIG. 2 illustrates example components of one or more server(s) 128 configured to support at least a portion of the functionality of the produce-recognition system including classifier component 138 and refiner component 140. In some examples, the produce recognition system described herein may be supported entirely, or at least partially, by the self-checkout device 108 in conjunction with the server(s) 128. The server(s) 128 may be physically present at the retailer facility 102, may be at a remote location accessible by network(s) 126, or a combination of both. The server(s) 128 do not require end-user knowledge of the physical location and configuration of the system that delivers the services. Common expressions associated with the server(s) 128 may include "on-demand computing," "software as a service (SaaS)," "cloud services," "data centers," and so forth. Services provided by the server(s) 128 may be distributed across one or more physical and/or virtual devices.

The server(s) 128 may include one or more hardware processors 202 configured to execute one or more stored instructions. The processors 202 may comprise one or more cores. The server(s) 128 may include one or more input/output (I/O) interface(s) 204 to allow the processor 202 or other portions of the server(s) 128 to communicate with other devices. The I/O interfaces 204 may comprise Inter-Integrated Circuit (I2C), Serial Peripheral Interface bus (SPI), Universal Serial Bus (USB) as promulgated by the USB Implementers Forum, RS-232, and so forth.

The server(s) 128 may also include one or more communication interfaces 206. The communication interfaces 206 are configured to provide communications between the server(s) 128 and other devices, such as the self-checkout device 108, the interface devices, routers, and so forth. The communication interfaces 206 may include devices configured to couple to personal area networks (PANs), wired and wireless local area networks (LANs), wired and wireless wide area networks (WANs), and so forth. For example, the communication interfaces 206 may include devices compatible with Ethernet, Wi-Fi™, and so forth.

The server(s) 128 may also include one or more busses or other internal communications hardware or software that allow for the transfer of data between the various modules and components of the server(s) 128.

As shown in FIG. 2, the server(s) 128 includes one or more memories 208. The memory 208 may include volatile and nonvolatile memory, removable and non-removable media implemented in any method or technology for storage of information, such as non-transitory computer-readable instructions, data structures, program component, or other data. Such memory 208 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 208 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 208 provides storage of computer-readable instructions, data structures, program modules, and other data for the operation of the server(s) 128. A few example functional modules are shown stored in the memory 208, although the same functionality may alternatively be implemented in hardware, firmware, or as a system on a chip (SOC).

The memory 208 may include at least one operating system (OS) 210. The OS 210 is configured to manage hardware resource devices such as the I/O interfaces 204, I/O devices, the communication interfaces 206, and provide various services to applications or modules executing on the processors 202. The OS 210 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 208. These modules may be executed as foreground applications, background tasks, daemons, and so forth.

A communication component 212 may be configured to establish communications with imaging sensor 104, the self-checkout device, other server(s) 128, or other devices. The communications may be authenticated, encrypted, and so forth.

A produce detection component 214 may be configured to perform various operations for processing the query image data 120 representing the features of a queried produce item to be used by the classifier component 138 and refiner component 140. For instance, the produce detection component 214 may perform various operations, and/or cause other components to perform various operations, to process the query image data 120. In some instances, the produce detection component 214 may at least partly control a localization component 142 that performs operations for analyzing query image data 120 depicting produce item 110. In some examples, the produce detection component 214 may cause the localization component 142 to analyze the query image data 120 and extract features which represent the produce item 110 and remove background objects that may be included in the query image. In this way, the query image data 120 generated by an image encoder component 136 accurately reflect the features of the produce item 110 to be identified.

After the produce detection component 214 obtains the query image data 120, the query image data 120 may be stored by the image database 130 for further processing and/or use by the training components 224, as described in more detail below. The various types of data discussed herein may be stored in data store 228 in the memory 208 of the server(s) 128. The query image data 120, produce category data 144, and/or produce subcategory data 146 may be in vector form and represent the feature embeddings of various produce items. Catalog data 218 may also be stored in the data store 228, which may include data indicating store-specific produce items.

Further, the produce detection component 214 may cause a training component 224(1) to train one or more trained model(s) 230. The training component 224(1) may use the query image data 120 and/or other types of data to train the trained model(s) 230 for extracting features from query image data 120 such that background objects are removed. The trained model(s) 230 may comprise any type of model, such as machine-learning models, including but not limited to artificial neural networks, classifiers, decision tress, support vector machines, Bayesian networks, and so forth. As a specific example, the trained model(s) 230 may include or comprise one or more neural networks and/or other artificial networks that are trained to analyze query image data 120 received as input, and extract, determine, identify, generate, etc. produce features representing produce item 110.

A classifier component 138 may be configured to perform various operations for processing the query image data 120. For instance, the classifier component 138 may perform various operations, and/or cause other components to perform various operations, in order to predict the produce category of produce item 110. In some instances, the classifier component 138 may cause the image encoder component 136 to determine and/or generate query image embeddings using the query image data 120. The image encoder component 136 may also generate image embeddings from category image data 144 and/or subcategory image data 146 stored at the image database 130. Further, the classifier component 138 may cause clustering component 232 to further process the query image data 120 to identify and distinguish query image data 120 for bagged or unbagged produce items. In some examples, the clustering component 232 may associate, or map, the query image data with either a bagged produce label or unbagged produce label. Thus, when the query image data 120 is used by the classifier component 138 and/or the refiner component 140, they are compared to category image data 144 and/or subcategory image data 146 that are associated with the same bagged or unbagged produce label.

In some instances, the classifier component 138 may at least partly control a similarity computation component 220(1) that performs operations for analyzing query image data 120 depicting the produce item 110. In some examples, the classifier component 138 may cause the similarity computation component 220(1) to compute measures of similarities for the query image data 120 and produce category image data 144.

After obtaining, determining, and/or generating measures of similarities for the query image data 120 and produce category image data 144, the classifier component 138 may cause the confidence score component 222 to associate, or map, the measures of similarities to confidence scores for each category of produce, where the confidence scores indicate a probability that the category image data 144 accurately identify the produce item 110 represented by the query image data 120. Further, the confidence score component 222 may rank the produce categories based on their confidence scores.

Further, the classifier component 138 may cause a training component 224(2) to train one or more trained model(s) 230. The training component 224(2) may use the query image data 120 and/or other types of data to train the trained model(s) 230 for determining predictions of the categories and/or confidence scores of produce categories. The trained model(s) 230 may comprise any type of model, such as machine-learning models, including but not limited to artificial neural networks, classifiers, decision tress, support vector machines, Bayesian networks, and so forth. As a specific example, the trained model(s) 230 may include or comprise one or more neural networks and/or other artificial networks that are trained to analyze query image data 120 received as input, and extract, determine, identify, generate, etc. produce output data indicating a ranking of produce categories based on their confidence scores. In another example, the trained model(s) 230 may use taxonomies 216, which may include various organizations of categories and/or subcategories.

In some instances, the classifier component 138 may cause training component 224(2) to train one or more trained model(s) 230. The training component 224(2) may use the query image data 120 and/or other types of data (e.g., user verification data) to train the trained model(s) 230 for determining confidence score thresholds for confidence workflows, as described in more detail in FIGS. 4A-4C. The trained model(s) 230 may comprise any type of model, such as machine-learning models, including but not limited to artificial neural networks, classifiers, decision tress, support vector machines, Bayesian networks, and so forth. As a specific example, the trained model(s) 230 may include or comprise one or more neural networks and/or other artificial networks that are trained to analyze query image data 120 received as input, and extract, determine, identify, generate, etc. produce output data indicating a ranking of produce categories based on their confidence scores. In another example, the classifier component 138 may at least partially control a calibration component 226 for calibrating the confidence scores generated by confidence score component 222 and/or the confidence score thresholds determined by the training component 224(2). In this way, the confidence scores may be calibrated to reflect the accuracy of the trained model(s) 230 in identifying a produce item. A refiner component 140 may be configured to perform various operations for processing the query image data 120. For instance, the refiner component 140 may perform various operations, and/or cause other components to perform various operations, in order to predict the produce subcategory of produce item 110. In some instances, the refiner component may at least partly control a similarity computation component 220(2) that performs operations for analyzing query image data 120 depicting the produce item 110. In some examples, the refiner component 140 may cause the similarity computation component 220(2) to compute measures of similarities for the query image data 120 and produce subcategory data 146.

After obtaining, determining, and/or generating measures of similarities for the query image data 120 and produce subcategory data 146, the refiner component 140 may cause the similarity score component 234 to associate, or map, the measures of similarities to similarity scores for each subcategory of produce. Further, the similarity score component 234 may rank the produce subcategories based on their confidence scores.

Further, the refiner component 140 may cause a training component 224(3) to train one or more trained model(s) 230. The training component 224(3) may use the query image data 120 and/or other types of data to train the trained model(s) 230 for determining similarity scores of produce subcategories. The training component 224(3) may also use the query image data 120 and/or other types of data to train the trained model(s) 230 for determining predictions of the subcategories. The trained model(s) 230 may comprise any type of model, such as machine-learning models, including but not limited to artificial neural networks, classifiers, decision tress, support vector machines, Bayesian networks, and so forth. As a specific example, the trained model(s) 230 may include or comprise one or more neural networks and/or other artificial networks that are trained to analyze query image data 120 received as input, and extract, determine, identify, generate, etc. produce output data indicating a ranking of produce subcategories based on their similarity scores.

Figure 3:
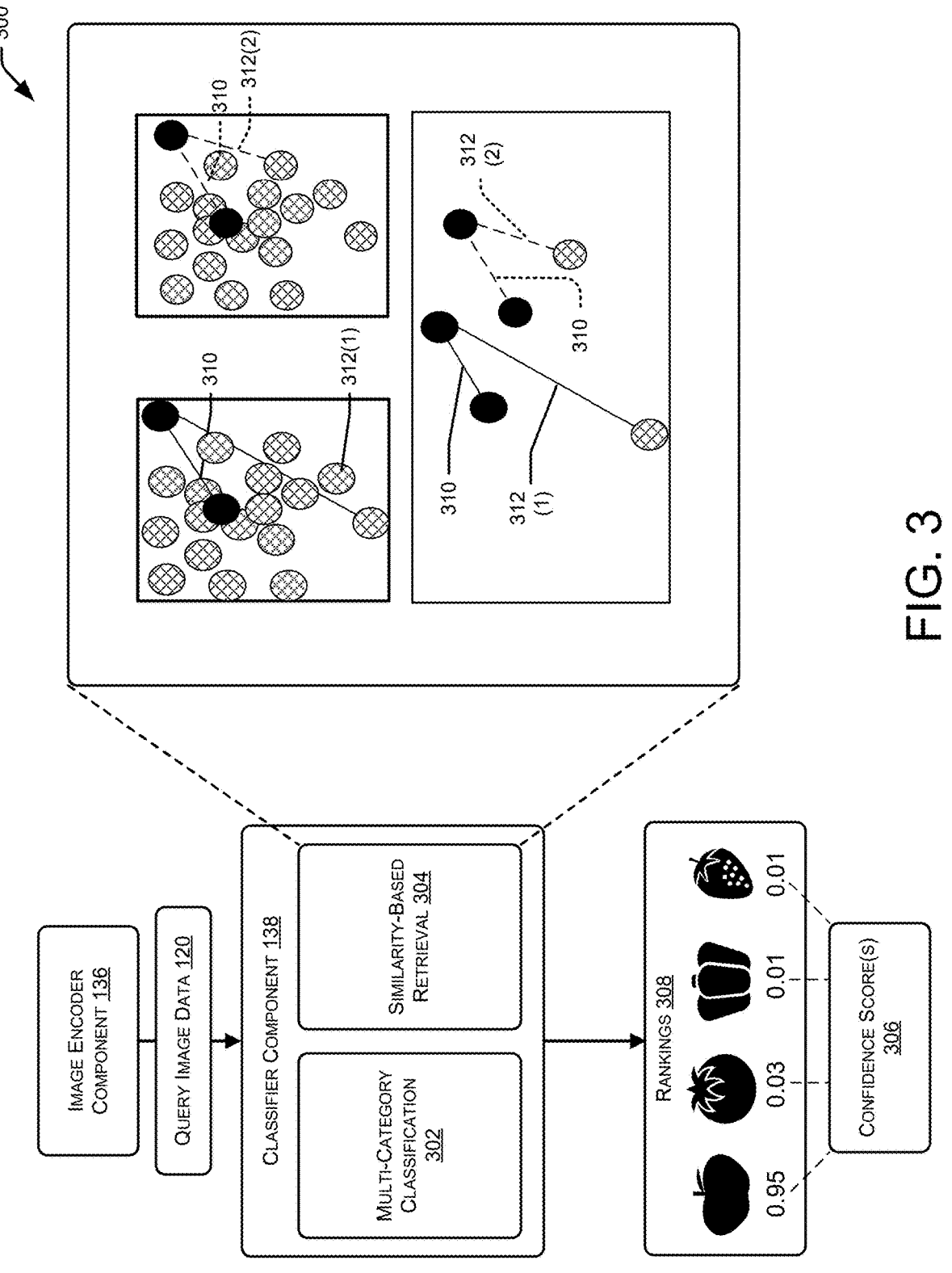
FIG. 3 illustrates an example process for predicting the identity of a produce item using multi-category classification and/or similarity-based retrieval.

FIG. 3 illustrates an example scenario 300 of processing query image data 120, comparing category embeddings representing the query image data 120, and/or using a neural network to predict categories of the produce item depicted in the query image data 120. While FIG. 3 depicts comparing category embeddings and/or predicting categories, the example scenario 300 may also be used to compare subcategory embeddings and/or predict subcategories of produce item depicted in the query image data 120.

As illustrated, query image data may be obtained by the classifier component 138. In some examples, the query image data 120 may be represented by image embeddings generated by the image encoder component 136.

The classifier component 138 (and/or the refiner component 140) may obtain the embeddings of query image data 120 and may compare, or match, by computing a distance between the query image embeddings and stored image embeddings using similarity-based retrieval 304. The stored image embeddings may represent features of a produce category and/or produce subcategory. For instance, the embeddings of query image data 120 may be compared to stored image embeddings to predict the identity of a produce item represented in the query image data 120.

In one example, the classifier component 138 using the similarity-based retrieval 304 may use embeddings generated by image encoder component 136, which may comprise a query image vector 310 that is compared with stored vectors 312(1) and/or 312(2) to determine which stored vectors have the smallest "distance" between the query image vector 310. The smaller the distance, the closer in similarity between the embeddings of image data 120 and the stored image embeddings. For example, vector 312(2) is smaller in distance than vector 312(1) to vector 310. As such, vector 312(2) represents a stored image that is most similar to the query image. In some examples, other calculations may be performed, such as finding a cosine of an angle between two vectors, depending on the network used by the trained model(s) 230. However, any type of models may be used for the trained model(s) 230. Based on the distances between vectors 310 and 312, the classifier component 138 using the similarity-based retrieval 304 may determine confidence scores 306 and rankings 308 based on the confidence scores 306.

In another example, multi-category classification 302 may be used by the classifier component 138 to predict the rankings 308, where the rankings 308 may be based on confidence score(s) 306 generated by a neural network. In one example, the classifier component 138 using the multi-category classification may use query image data 120 as input to a neural network configured to predict produce categories and/or subcategories. Based on the neural network prediction, the classifier component 138 using the multi-category classification 302 may determine confidence scores 306 and rankings 308 based on the confidence scores 306.

Figure 4A:
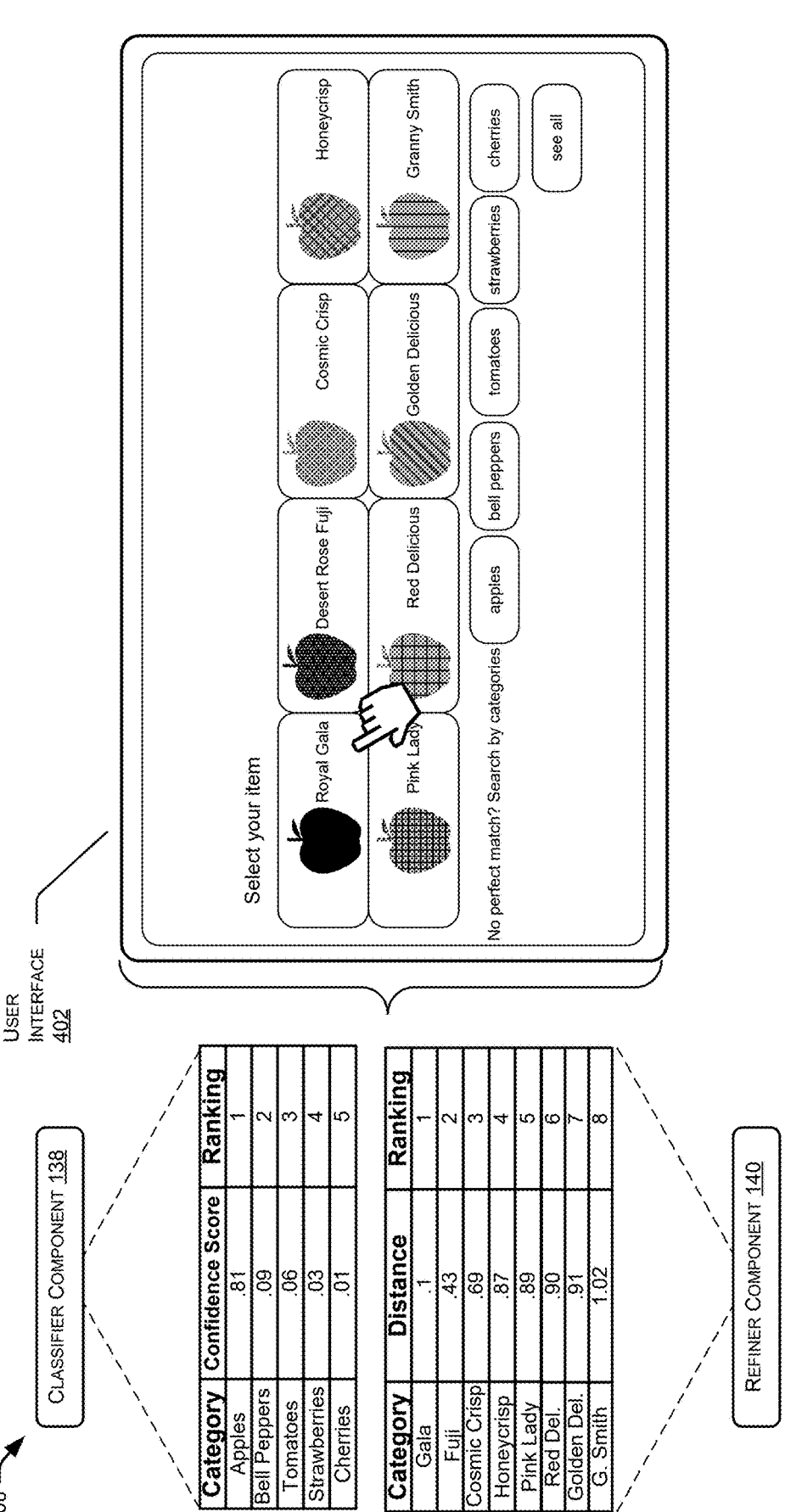
FIGS. 4A, 4B, and 4C illustrate example user interfaces that dynamically present selectable produce options based on a confidence workflow of the identified produce category and/or produce subcategory, according to at least some examples.
Figure 4B:
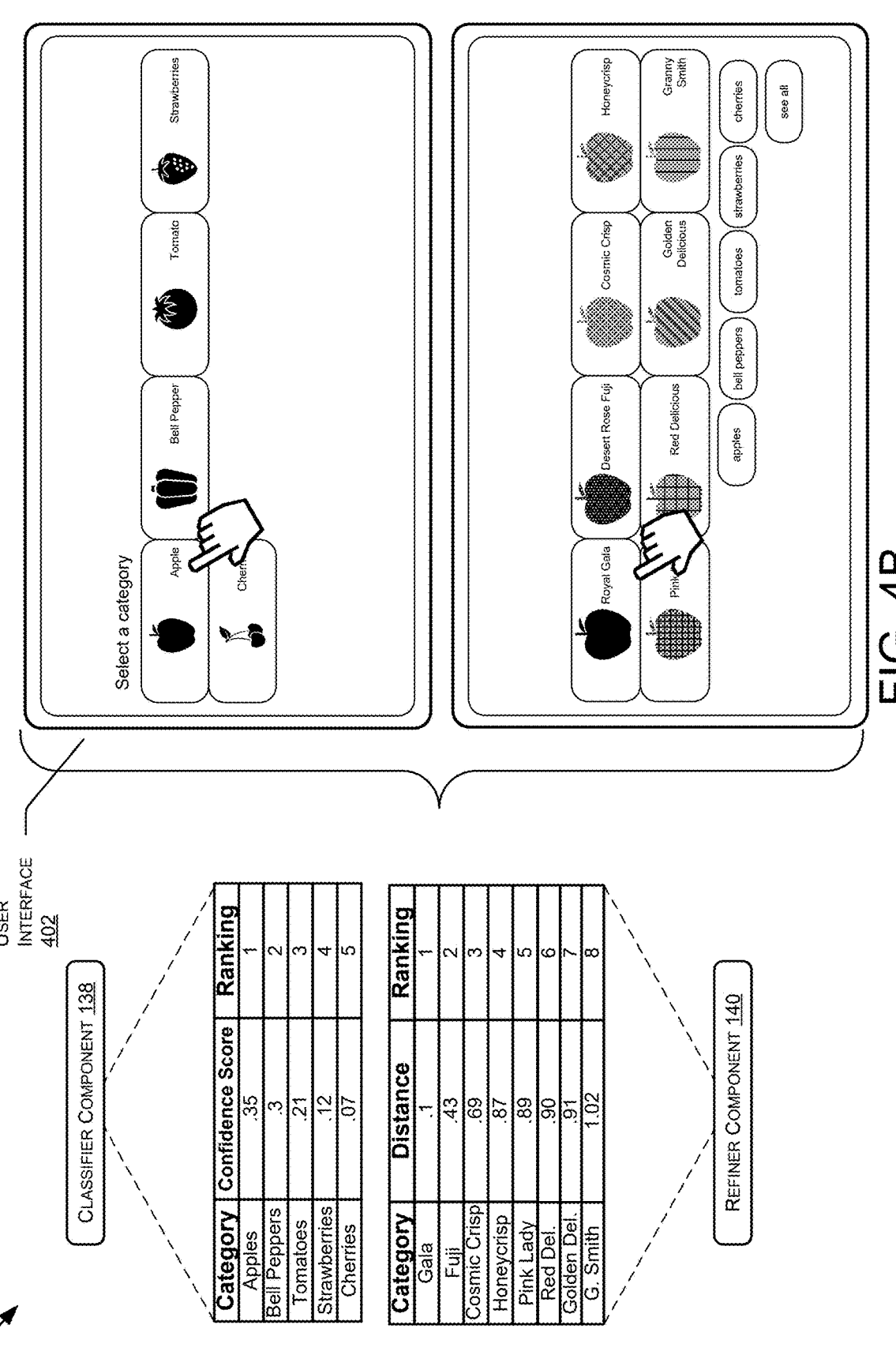
Figure 4C:
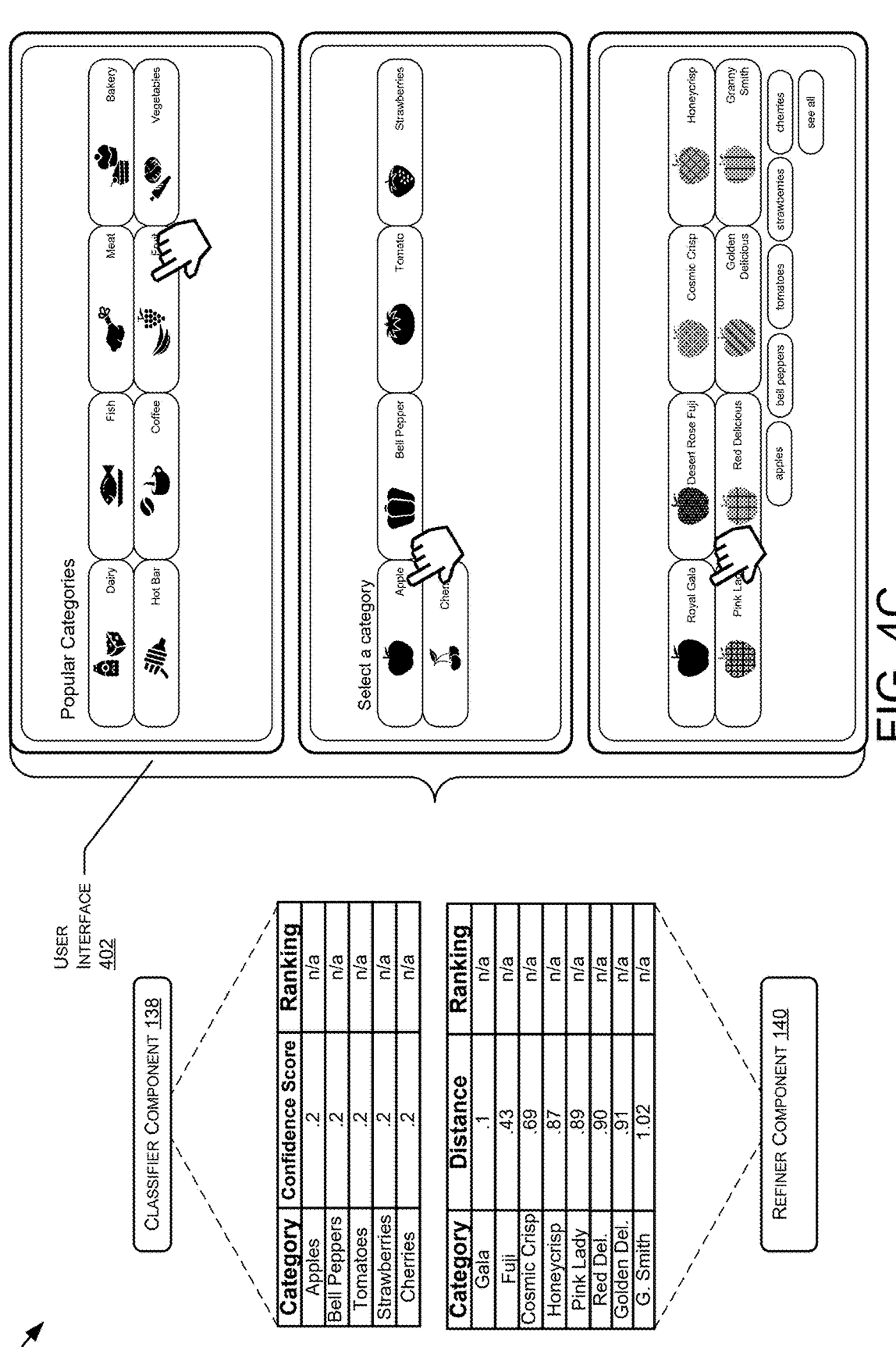

FIGS. 4A-4C illustrate example user interfaces that dynamically present selectable produce options based on a confidence workflow of the identified produce category and/or produce subcategory. In some examples, the confidence workflow may comprise a single workflow and/or multiple workflows.

In scenario 400 of FIG. 4A, the classifier component 138 may rank the produce categories of apples, bell peppers, tomatoes, strawberries, and cherries based on their confidence score. For example, the category of apples has a confidence score of 81%, indicating a prediction that the produce item 110 being purchased by the user 106 is likely an apple. The refiner component 140 may rank the produce subcategories within the categories, such as the apple category, based on their similarity scores (e.g., distances). The ranked produce subcategories indicate a prediction that the produce item 110 being purchased by the user 106 is likely a Gala apple. The self-checkout device 108 may determine that the confidence score may be at or above a threshold determined by the classifier component 138, indicating a high confidence workflow. Based on the high confidence workflow, the self-checkout device 108 may display the ranked produce subcategory predictions, as well as the ranked produce category predictions, at the user interface 402. The user 106 may then select the category and/or subcategory of produce item 110 they are purchasing, and the produce item is identified and added to the virtual cart of the user 106.

In scenario 400 of FIG. 4B, the classifier component 138 may rank the produce categories of apples, bell peppers, tomatoes, strawberries, and cherries based on their confidence score. For example, the category of apples has a confidence score of 35%, indicating a prediction that the produce item 110 being purchased by the user 106 may be an apple. However, there is also a confidence score of 30% for bell peppers. The self-checkout device 108 may determine that the confidence score may be at or above a threshold determined by the classifier component 138, indicating a medium confidence workflow. Based on the medium confidence workflow, the self-checkout device 108 may display the ranked produce category predictions at the user interface 402. The refiner component 140 may rank the produce subcategories within the categories, such as the apple category, based on their similarity scores (e.g., distances). Only upon receiving user input from the user 106 may the self-checkout device 108 display the ranked produce subcategory predictions at the user interface 402. The user 106 may then select the category and/or subcategory of produce item 110 they are purchasing, and the produce item 110 is identified and added to the virtual cart of the user 106.

In scenario 400 of FIG. 4C, the classifier component 138 may be unable to rank the produce categories of apples, bell peppers, tomatoes, strawberries, and cherries based on their confidence score. For example, the classifier component 138 may determine that there is an equal probability for the produce item 110 to be an apple, bell pepper, tomato, strawberry, or cherry. The self-checkout device may determine that the that the confidence score is below a threshold determined by the classifier component 138, indicating a low confidence workflow. Based on the low confidence workflow, the self-checkout device 108 may display course-level category sets, and the user 106 may manually go through the course-level category sets, categories, and/or subcategories. The user 106 may then select the category and/or subcategory of the produce item 110 they are purchasing, and the produce item 110 is identified and added to the virtual cart of the user 106.

Figure 5:
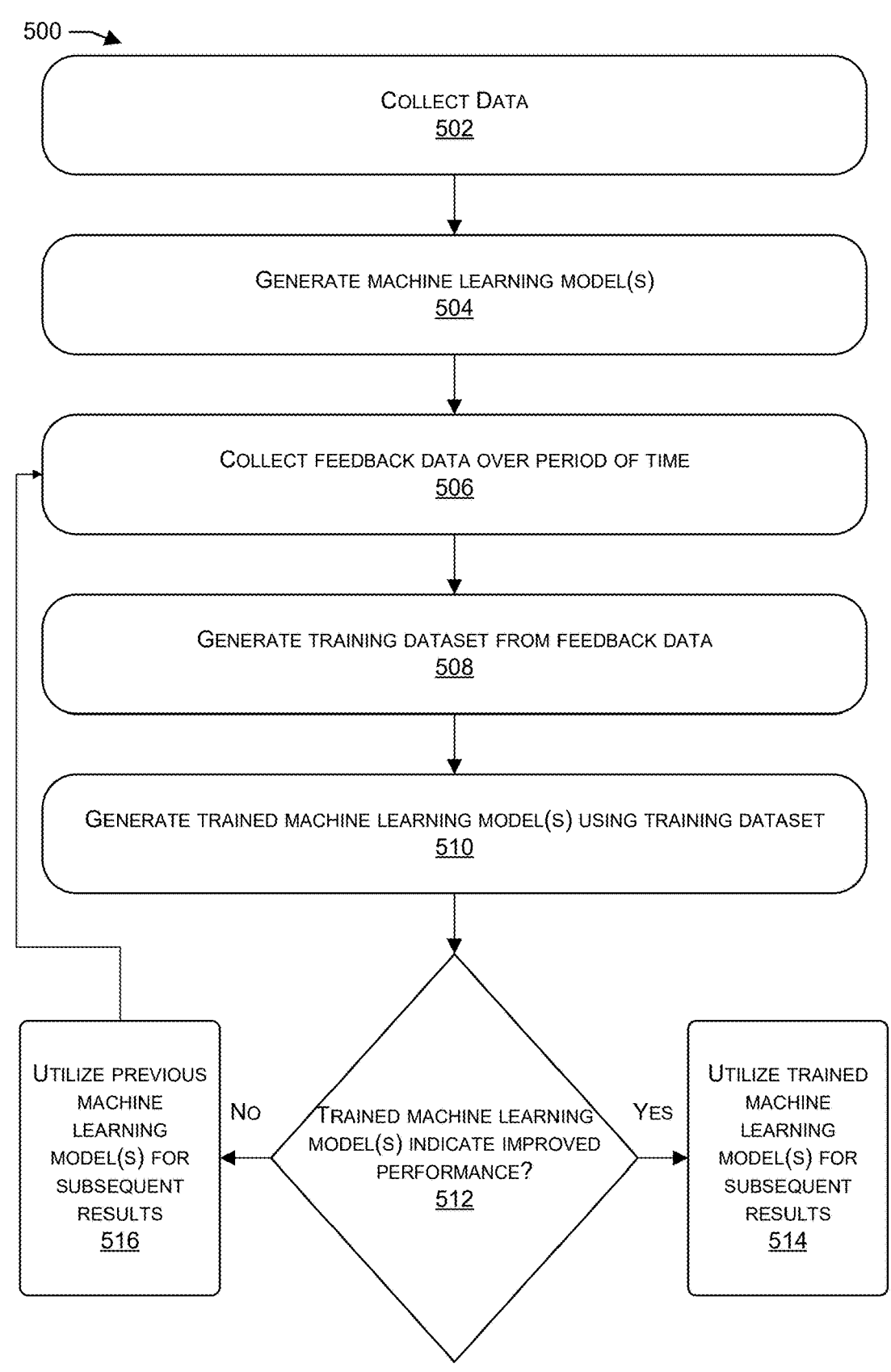
FIG. 5 illustrates a flow diagram of an example process for the generation of a machine-learning model and the use of the same, according to at least some examples.

FIG. 5 illustrates example process for the generation of a machine-learning model and the use of the same. The order in which the operations or steps are described is not intended to be construed as a limitation, and any number of the described operations may be combined in any order and/or in parallel to implement process 500.

At block 502, the process 500 may include collecting data. The data may include any data described with respect to FIGS. 1-4, or any other data that may be used to perform the operations described herein.

At block 504, the process 500 may include generating one or more artificial intelligence models, such as a machine learning model. A number of artificial intelligence techniques may be employed to generate and/or modify the layers and/or models described herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based artificial intelligence.

At block 506, the process 500 may include collecting feedback data over a period of time. The feedback data may include any data described with respect to FIGS. 1-4, or any other data that may be used to perform the operations described herein.

At block 508, the process 500 may include generating a training dataset from the feedback data. Generation of the training dataset may include formatting the feedback data into input vectors for the artificial intelligence model to intake, as well as associating the various data with the produce category and/or produce subcategory as described herein.

At block 510, the process 500 may include generating one or more trained artificial intelligence models using the training dataset. Generation of the trained artificial intelligence models may include updating parameters and/or weightings and/or thresholds used by the models to determine ranked produce categories and/or subcategories predicting the identity of a produce item.

At block 512, the process 500 may include determining whether the trained artificial intelligence models indicate improved performance metrics. For example, a testing group may be generated where the produce categories and subcategories are known, but not to the trained artificial intelligence models. The trained artificial intelligence models may generate results, which may be compared to the known results to determine whether the results of the trained artificial intelligence model produce a superior result than the results of the artificial intelligence model prior to training.

In examples where the trained artificial intelligence models indicate improved performance metrics, the process 500 may include, at block 514, using the trained artificial intelligence models for generating subsequent results. For example, the trained artificial intelligence models may be used to calibrate confidence score thresholds and the like. It should be understood that the trained artificial intelligence models may be used in any scenario where models are used as described herein.

In examples where the trained artificial intelligence models do not indicate improved performance metrics, the process 500 may include, at block 516, using the previous iteration of the artificial intelligence models for generating subsequent results. Additionally, or alternatively, the process 500 may include, at block 516, reverting back to block 506 and collecting more feedback data over a period of time.

FIG. 6 illustrates an example process for automatically recognizing produce items being purchased at a self-checkout device, according to at least some examples of the present description. The order in which the operations or steps are described is not intended to be construed as a limitation, and any number of described operations may be combined in any order and/or in parallel to implement process 600.

At block 602, the process 600 may include receiving first image data representing an item. For example, a user may be engaged in checking out a produce item where the user places the produce item on the self-checkout device such as on a weight scale. The self-checkout device may include one or more sensors, such as imaging sensor. In this example, the imaging sensor may be configured to detect the produce item positioned in the environment of the self-checkout device. Further, the imaging sensor may be configured to collect query image data of the item. The self-checkout device may comprise components for performing at least a characteristic of the techniques of predicting the identity of an item for purchase, as may the servers.

In this example, the self-checkout device may receive user input requesting to purchase an item, such as an input made via I/O interfaces (e.g., tough screen, mouse, keyboard, etc.) of a user interface component presented on display at the self-checkout device. After receiving the request to purchase the produce item, the imaging sensor at the self-checkout device may obtain query image data of the produce item. Once the imaging sensor has obtained the query image data, The self-checkout device may send (e.g., upload, stream, etc.) the query image data to the server over one or more networks using one or more communication interfaces.

In some examples, one or more components of the servers may store the query image data in an image database. The image database may also store image data of produce categories and subcategories. That is, the query image data is stored such that it may be compared to the image data of the other produce categories and subcategories. Upon receiving the query image data, one or more components of the servers may generate image embeddings using the query image data. The image embeddings may be in vector form and represent the features of produce items, such as produce item. For example, the image encoder component may generate query image embeddings using the query image data. The image encoder component may also generate category image embeddings and subcategory image embeddings from the image data of produce categories and subcategories, respectively.

The image database may store image data of produce categories and/or image data of produce subcategories. Produce categories may include apples, bell peppers, tomatoes, and the like. Produce subcategories within a category, for example apples, may include Gala apples, Fuji apples, Honeycrisp apple, etc. The image encoder component may generate category image embeddings and subcategory image embeddings using the category and subcategory image data. The image embeddings may be in vector form and represent the features of the produce items in a category and/or subcategory.

At block 604, the process 600 may include determining a confidence score indicative of a probability that the item is associated with the category. For example, upon identifying similar category image embeddings, the classifier component may generate category output data indicating the result of the comparison of the query image embeddings and category image embeddings. For example, the output data may indicate that the query image embeddings are similar to one category image embedding, but is not similar to another category image embedding. In another example, the classifier component may generate the output data indicating the result of the neural network configured to predict produce categories using the query image data. The category output data may also indicate a probability, or "confidence score," of the category image embeddings accurately identifying the produce item represented by the query image embeddings.

At block 606, the process 600 may include generating a category ranking within the category set, the ranking being based at least in part on the confidence score. For example, the classifier component may rank the categories based their respective confidence scores, which may be used by the self-checkout device in presenting the predictions of the produce item to the user.

At block 608, the process 600 may include determining a similarity score indicative of a similarity between the item and the subcategory. For example, upon identifying similar subcategory image embeddings, the refiner component may generate subcategory output data indicating the result of the comparison of the query image embeddings and subcategory image embeddings. For example, the output data may indicate that the query image embeddings are similar to one subcategory image embedding, but is not similar to another subcategory image embedding. In another example, the classifier component may generate the output data indicating the result of the neural network configured to predict produce subcategories using the query image data. The subcategory output data may also indicate a "similarity score" for the subcategory image embeddings. The similarity score may be a vector's distance, where the lower the distance the higher the similarity score is.

At block 610, the process 600 may include generating a subcategory ranking within the subcategory set, the ranking being based at least in part on the similarity score. For example, the refiner component may rank the subcategories based on their respective similarity scores, which may be used by the self-checkout device in presenting predictions of the produce item to the user.

At block 612, the process 600 may include causing display of at least one of the category ranking and the subcategory ranking to a user. For example, the category output data and/or subcategory output data may be sent by the server to the self-checkout device via networks. In this way, the self-checkout device may use the category output data and/or subcategory output data to display the rankings of produce categories and/or subcategories as predictions of the identity of the produce item. The self-checkout device may present such identity predictions via a I/O interface.

At block 614, the process 600 may include receiving a user input responsive to the display of at least one of the category ranking and the subcategory ranking. For example, the self-checkout device may determine that the confidence score may be at or above a threshold determined by the classifier component, indicating a high confidence workflow. Based on the high confidence workflow, the self-checkout device may display the ranked produce subcategory predictions, as well as the ranked produce category predictions, at the user interface. The user may then select the category and/or subcategory of produce item they are purchasing, and the produce item is identified and added to the virtual cart of the user.

In some examples, the self-checkout device may determine that the confidence score may be at or above a threshold determined by the classifier component, indicating a medium confidence workflow. Based on the medium confidence workflow, the self-checkout device may display the ranked produce category predictions at the user interface. The refiner component may rank the produce subcategories within the categories, such as the apple category, based on their similarity scores (e.g., distances). Only upon receiving user input from the user may the self-checkout device display the ranked produce subcategory predictions at the user interface. The user may then select the category and/or subcategory of produce item they are purchasing, and the produce item is identified and added to the virtual cart of the user.

In some examples, the self-checkout device may determine that the that the confidence score is below a threshold determined by the classifier component, indicating a low confidence workflow. Based on the low confidence workflow, the self-checkout device may display course-level category sets, and the user may manually go through the course-level category sets, categories, and/or subcategories. The user may then select the category and/or subcategory of the produce item they are purchasing, and the produce item is identified and added to the virtual cart of the user.

At block 616, the process 600 may include determining an identified item based at least in part on the user input.

At block 618, the process 600 may include adding the identified item to a virtual cart of the user.

Additionally, or alternatively, the process 600 may include determining a comparison between the category and the subcategory with an account of the user. The process 600 may also include updating the category ranking and the subcategory ranking based at least in part on the comparison with the account of the user.

Additionally, or alternatively, the process 600 may include, wherein the confidence score is a first confidence score, and in response to the first confidence score violating a threshold, generating, using a machine learning model trained to identify items a second confidence score indicating the probability that the item is associated with the category. The process 600 may also include generating the category ranking within the category set, the ranking being based on the second confidence score instead of the first confidence score.

Additionally, or alternatively, the process 600 may include, wherein the similarity score is a first similarity score, and in response to the first similarity score violating a threshold, generating, using a machine learning model trained to identify items, a second similarity score indicating the probability that the item is associated with the subcategory. The process 600 may also include generating the subcategory ranking within the subcategory set, the ranking being based on the second similarity score instead of the first similarity score.

Additionally, or alternatively, the process 600 may include, wherein the image data is first image data, determining a comparison between the first image data and second image data, wherein the second image data includes embeddings representing the category from the category set. The process may also include determining a comparison between the first image data and third image data, wherein the third image data includes embeddings representing the subcategory from the subcategory set.

Additionally, or alternatively, the process 600 may include wherein determining the confidence score and the similarity score is based at least in part on a neural network configured to predict categories and subcategories.

Additionally, or alternatively, the process 600 may include determining a confidence threshold associated with the confidence score. The process 600 may also include determining a similarity threshold associated with the similarity score. The process 600 may also include, based at least in part on the confidence score being above the confidence threshold, and the similarity score being below the similarity threshold, causing display of the category ranking.

Additionally, or alternatively, the process 600 may include determining a confidence threshold associated with the confidence score. The process 600 may also include determining a confidence threshold associated with the similarity score. The process 600 may also include, based at least in part on the confidence score being below the confidence threshold, and the similarity score being below the similarity threshold, causing display of a plurality of category sets.

While the foregoing description is described with respect to the specific examples, it is to be understood that the scope of the description is not limited to these specific examples. Since other modifications and changes varied to fit particular operating requirements and environments will be apparent to those skilled in the art, the description is not considered limited to the example chosen for purposes of description and covers all changes and modifications which do not constitute departures from the true spirit and scope of this description.

Although the application describes examples having specific structural features and/or methodological acts, it is to be understood that the claims are not necessarily limited to the specific features or acts described. Rather, the specific features and acts are merely illustrative some examples that fall within the scope of the claims

What is claimed is:

1. A self-checkout system comprising:
a display;
a camera;
a computing device; and
a non-transitory storage medium having instructions stored thereon, that, when executed by the computing device, cause the computing device to perform operations comprising:
  receiving first image data from the camera, wherein the first image data represents a produce item in view of the camera;
  determining a comparison between the first image data and second image data, wherein the second image data represents at least one produce category of a set of produce categories;
  determining, based at least in part on the first image data and second image data, a first plurality of confidence scores, wherein each one of the first plurality of confidence scores is indicative of a probability that the produce item is associated with one of the set of produce categories;
  generating a produce category ranking of the set of produce categories, wherein the produce category ranking is generated based at least in part on the first plurality of confidence scores;

determining a comparison between the first image data and third image data, wherein the third image data represents at least one produce subcategory of a set of produce subcategories, wherein each one of the produce subcategories in the set of produce subcategories is in one of the set of produce categories;
  determining, based at least in part on the first image data and the third image data, a first plurality of similarity scores, wherein each one of the first plurality of similarity scores is indicative of a similarity between the produce item and one of the set of produce subcategories;
  generating a produce subcategory ranking of the set of produce subcategories, wherein the produce subcategory ranking is generated based at least in part on the first plurality of similarity scores;
  determining a comparison between at least one of the set of produce categories or the set of produce subcategories and a merchant produce catalog;
  updating at least one of the produce category ranking or the produce subcategory ranking based at least in part on the comparison with the merchant produce catalog;
  selecting a plurality of images representing at least some of the set of produce categories or at least some of the set of produce subcategories;
  causing display of the plurality of images in accordance with at least one of the produce category ranking or the produce subcategory ranking on the display;
  receiving a user input responsive to the display of the plurality of images;
  determining an identified produce item based at least in part on the user input; and
  adding the identified produce item to a virtual cart of the user.

2. The self-checkout system as recited in claim 1, wherein the first plurality of confidence scores comprises a first confidence score,
  wherein the first plurality of similarity scores comprises a first similarity score, and
  wherein the operations further comprise:
  generating, using a machine learning model trained to identify produce items, a second confidence score indicating the probability that the produce item is associated with the at least one produce category based at least in part on the user input;
  generating the produce category ranking of the set of produce categories based at least in part on the second confidence score;
  generating, using the machine learning model trained to identify produce items, a second similarity score indicating the probability that the produce item is associated with the produce subcategory based at least in part on the user input; and
  generating the produce subcategory ranking of the set of produce subcategories based on the second similarity score.

3. The self-checkout system as recited in claim 1, wherein determining the comparison between the first image data and the second image data comprises:
  determining, based at least in part on the first image data, that the produce item is a bagged produce item; and
  selecting a produce category from the set of produce categories, wherein the selected produce category is a bagged produce category, and
  wherein the second image data represents the bagged produce category.

4. A method comprising:

receiving at least one image captured by a camera associated with a self-checkout system, wherein the at least one image depicts an item;

calculating at least one confidence score based at least in part on the at least one image, wherein the at least one confidence score is indicative of a probability that the item is associated with at least one category in a set of categories;

generating a category ranking of the set of categories based at least in part on the at least one confidence score;

calculating at least one similarity score based at least in part on the at least one image, wherein the at least one similarity score is indicative of a similarity between the item and at least one subcategory in a set of subcategories, and wherein each one of the subcategories in the set of subcategories is in one category of the set of categories;

generating a subcategory ranking of the set of subcategories based at least in part on the at least one similarity score;

causing display of a plurality of images on a display of the self-checkout system to a user, wherein the plurality of images represent at least one of:

at least a subset of the set of categories selected at least in part on the category ranking; or at least a subset of the set of subcategories selected based at least in part on the subcategory ranking;

receiving a user input via the display, wherein the user input comprises a selection of one of the plurality of images;

identifying the item based at least in part on the user input, wherein the selected one of the plurality of images represents at least one of a produce category of the item or a subcategory of the item; and adding the item to a virtual cart of the user.

5. The method as recited in claim 4, further comprising:

determining a comparison between at least one of the set of categories or at least one of the set of subcategories with an account of the user; and updating at least one of the category ranking or the subcategory ranking based at least in part on the comparison.

6. The method as recited in claim 4, wherein the at least one confidence score comprises a first confidence score, wherein generating the category ranking based at least in part on the at least one confidence score comprises:

determining that the first confidence score violates a threshold; and in response to determining that the first confidence score violates the threshold, generating, using a machine learning model trained to identify items, at least a second confidence score indicating a probability that the item is associated with the at least one category; and generating the category ranking based at least in part on the second confidence score, and wherein the method further comprises:

training the machine learning model based at least in part on the user input.

7. The method as recited in claim 6, wherein the at least one similarity score is a first similarity score, and wherein generating the subcategory ranking based at least in part on the at least one similarity score comprises:

in response to determining that the first similarity score violates the threshold, generating, using a machine learning model trained to identify items, at least a second similarity score indicating a probability that the item is associated with the at least one subcategory; and generating the subcategory ranking based at least in part on the second similarity score, and wherein the method further comprises:

training the machine learning model based at least in part on the user input.

8. The method as recited in claim 4, further comprising:

generating an embedding based at least in part on the at least one image;

determining a first comparison between the embedding and a first plurality of embeddings, wherein each one of the first plurality of embeddings represents an image associated with one category in the set of categories, and wherein the at least one confidence score is calculated based at least in part on the first comparison; and determining a second comparison between the embedding and a second plurality of embeddings, wherein each one of the second plurality of embeddings represents an image associated with one subcategory in the set of subcategories, and wherein the at least one similarity score is calculated based at least in part on the second comparison.

9. The method as recited in claim 4, wherein at least one of the at least one confidence score or the at least one similarity score is calculated based at least in part on at least one output received from a neural network configured to predict categories and subcategories.

10. The method as recited in claim 4, further comprising:

determining a confidence threshold associated with the at least one confidence score;

determining a similarity threshold associated with the at least one similarity score;

determining that the at least one confidence score exceeds the confidence threshold, determining that the at least one similarity score exceeds the similarity threshold; and in response to determining that the at least one confidence score exceeds the confidence threshold and that the at least one similarity score exceeds the similarity threshold, selecting the plurality of images, wherein each one of the plurality of images represents one of the subset of the set of categories or one of the subset of the set of subcategories.

11. The method as recited in claim 4, further comprising:

determining a confidence threshold associated with the at least one confidence score;

determining a similarity threshold associated with the at least one similarity score;

determining that the at least one confidence score exceeds the confidence threshold;

determining that the at least one similarity score does not exceed the similarity threshold; and in response to determining that the at least one confidence score exceeds the confidence threshold and that the at least one similarity score does not exceed the similarity threshold, selecting the plurality of images, wherein each one of the plurality of images represents one of the subset of the set of categories.

12. The method as recited in claim 4, further comprising:

determining a confidence threshold associated with the at least one confidence score;

determining a similarity threshold associated with the at least one similarity score;

determining that the at least one confidence score does not exceed the confidence threshold; and in response to determining that the at least one confidence score does not exceed the confidence threshold, selecting the plurality of images, wherein each one of the plurality of images represents one of the set of categories.

13. A self-checkout system comprising:

a camera;

a display;

a computing device; and a non-transitory storage medium having instructions stored thereon, that, when executed by the computing device, cause the computing device to perform operations comprising:

receiving first image data representing an item, wherein the first image data is captured by the camera;

determining a comparison between the first image data and second image data representing a category from a category set;

determining at least one confidence score indicative of a probability that the item is associated with the category based at least in part on the comparison between the first image data and the second image data;

generating a category ranking within the category set, the ranking being based at least in part on the at least one confidence score;

determining a comparison between the first image data and third image data representing a subcategory from a subcategory set, wherein the category includes the subcategory set;

determining at least one similarity score indicative of a similarity between the item and the subcategory based at least in part on the comparison between the first image data and the third image data;

generating a subcategory ranking within the subcategory set, the ranking being based at least in part on the at least one similarity score;

causing display of a plurality of images on the display of the self-checkout system to a user, wherein the plurality of images represent at least one of:

at least a subset of the category set selected based at least in part on the category ranking; or at least a subset of the subcategory set selected based at least in part on the subcategory ranking;

receiving a user input via the display, wherein the user input comprises a selection of one of the plurality of images;

identifying the item based at least in part on the user input, wherein at least one of a category of the item or a subcategory of the item is represented in the selected one of the plurality of images; and adding the item to a virtual cart of the user.

14. The self-checkout system as recited in claim 13, wherein the operations further comprise:

determining a comparison between at least one of the category set or at least one of the subcategory set with a merchant catalog; and updating at least one of the category ranking or the subcategory ranking based at least in part on the comparison with the merchant catalog.

15. The self-checkout system as recited in claim 13, wherein the at least one confidence score is a first confidence score, and wherein the operations further comprise:

determining that the first confidence score violated a threshold; and in response to determining that the first confidence score violated the threshold, generating, using a machine learning model trained to identify items, a second confidence score indicating a probability that the item is associated with the category; and generating the category ranking based at least in part on the second confidence score.

16. The self-checkout system as recited in claim 13, wherein the at least one similarity score is a first similarity score, and wherein the operations further comprise:

determining that the first similarity score violated a threshold; and in response to determining that the first similarity score violated the threshold, generating, using a machine learning model trained to identify items, a second similarity score indicating a probability that the item is associated with the subcategory; and generating the subcategory ranking based at least in part on the second similarity score.

17. The self-checkout system as recited in claim 13, wherein determining the comparison between the first image data and the second image data comprises:

determining that the item is a containerized item;

selecting at least one containerized category from the category set; and determining the comparison between the first image data and the second image data, wherein the second image data represents the at least one containerized category.

18. The self-checkout system as recited in claim 13, wherein the operations further comprise:

determining a confidence threshold associated with the at least one confidence score;

determining a similarity threshold associated with the at least one similarity score;

determining that the at least one confidence score exceeds the confidence threshold;

determining that the at least one similarity score does not exceed the similarity threshold; and in response to determining that the at least one confidence score exceeds the confidence threshold and that the at least one similarity score does not exceed the similarity threshold, selecting the plurality of images, wherein each one of the plurality of images represents one of the subset of the set of categories.

19. The self-checkout system as recited in claim 13, wherein the operations further comprise:

determining a confidence threshold associated with the at least one confidence score;

determining a similarity threshold associated with the at least one similarity score;

determining that the at least one confidence score exceeds the confidence threshold;

determining that the at least one similarity score does not exceed the similarity threshold;

in response to determining that the at least one confidence score exceeds the confidence threshold and that the at least one similarity score does not exceed the similarity threshold, selecting the plurality of images, wherein each one of the plurality of images represents one of the set of categories.

20. The self-checkout system as recited in claim 13, wherein the operations further comprise:

determining a confidence threshold associated with the at least one confidence score;

determining a similarity threshold associated with the at least one similarity score;

determining that the at least one confidence score does not exceed the confidence threshold; and in response to determining that the at least one confidence score does not exceed the confidence threshold, selecting the plurality of images, wherein each one of the plurality of images represents one of the set of categories.

* * * * *